May 27, 1924.
H. F. SMOLK
CHOPPER
Filed Feb. 9, 1924
1,495,211
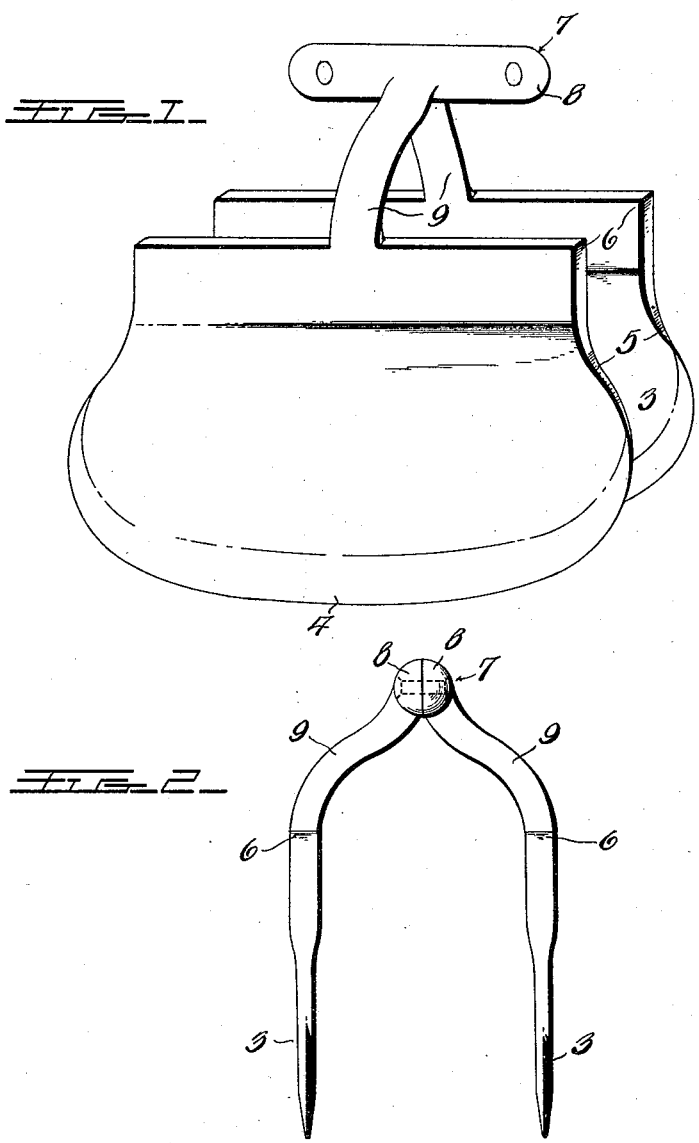
Inventor
Helena F. Smolk
By John A. Bornhardt
Attorney Patented May 27, 1924.

1,495,211

UNITED STATES PATENT OFFICE.

HELENA F. SMOLK, OF CLEVELAND, OHIO.

CHOPPER.

Application filed February 9, 1924. Serial No. 691,660.

*To all whom it may concern:*

Be it known that I, HELENA F. SMOLK, a citizen of the United States, residing at Cleveland, in the county of Cuyahoga and State of Ohio, have invented certain new and useful Improvements in Choppers, of which the following is a specification.

This invention relates to improvements in choppers, having for an object to provide a device of this character which will be of simple and comparatively inexpensive construction.

It is likewise an object to provide a double-bladed chopper constructed to facilitate use in chopping up nuts or the like, particularly where they are placed in a bowl having a continous curved body.

In order that the invention and its mode of operation may be readily understood by persons skilled in the art, I have in the accompanying illustrative drawings and in the following detailed description based thereon, set out one possible embodiment of the same.

In these drawings:

Fig. 1 is a perspective view of the chopper, and

Fig. 2 is an end elevation thereof.

Having more particular reference to the drawings throughout which similar characters of reference designate similar parts, this improved cutter may be stated as comprising a pair of spaced chopping blades 3, each blade as clearly shown in the drawing being provided with a curved chopping edge 4 merging into the thickened end portions 5 which as shown continue upwardly into the thickened edge or back 6.

The back is thickened or weighted in order to lessen the exertion by the operator in using the chopper.

A two-part handle 7 is arranged centrally between the blades 3 and slightly thereabove, each part 8 being connected to the upper edge of a blade by means of a curved arm 9, these three elements preferably being formed in a single piece or unit. In assembling the chopper the two handle portions 8 may be riveted or otherwise securely connected thereby providing a handle which may be readily gripped by the operator and which is so positioned as to be absolutely unobstructive during use of the chopper.

It is quite apparent that due to the fact that each half of this chopper is identically formed as regards the other half, the construction is such as will reduce the cost of manufacture to a minimum.

Certain minor changes in the details of construction may be resorted to and such changes as fall within the scope of the appended claims, I consider within the spirit of my invention.

I claim:

1. A device of the character described comprising a pair of spaced parallel blades having thickened upper edges, an upwardly inwardly curved arm formed integrally with and extending from the midway point of the upper edge of each blade, a portion of a handle member carried by each arm, and fastening elements arranged to connect the two handle portions.

2. A chopper including a pair of identical parts, each part comprising a blade having a continuously curved edge, a thickened back portion, an upwardly laterally curved integral arm extending from a point midway the length of the blade, a half portion of a handle integrally formed with the arm at its upper end and extending in parallel relation with respect to the blade, said handle portion having a pair of transverse spaced apertures, and fasteners receivable in the apertures to inter-connect the parts.

In testimony whereof, I affix my signature.

HELENA F. SMOLK.